United States Patent Office 3,338,535
Patented Aug. 29, 1967

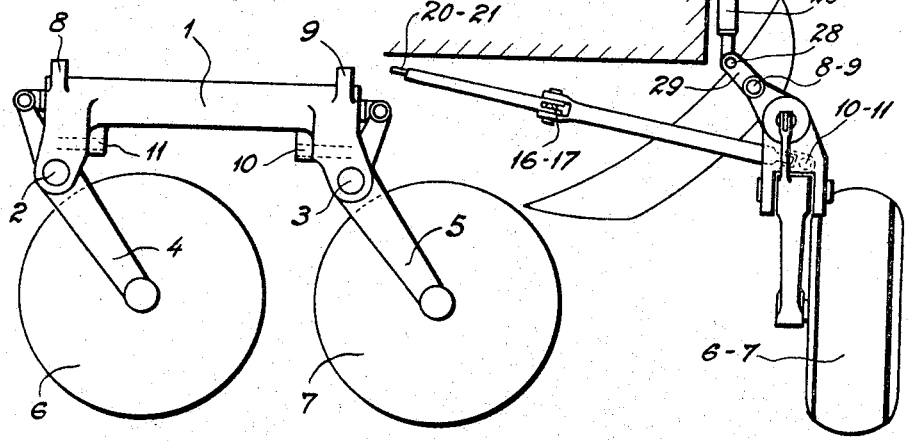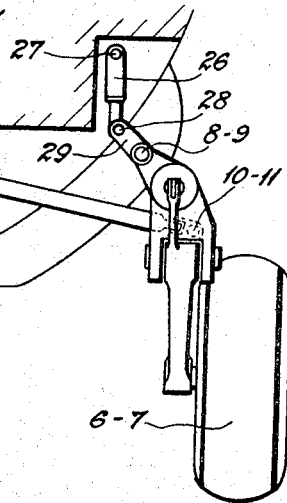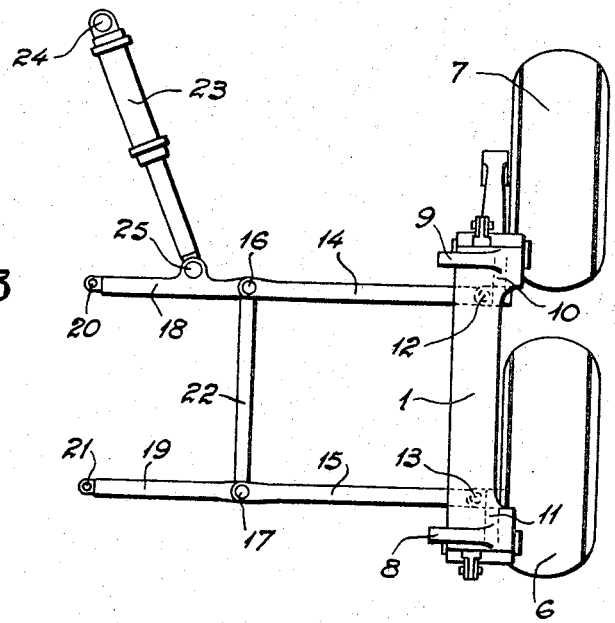

3,338,535
UNDER CARRIAGE WITH TANDEM WHEELS
René Lucien, Neuilly-sur-Seine, France, assignor to Société R.E.P., Recherches Etudes Production, Paris, France
Filed Oct. 4, 1965, Ser. No. 492,709
Claims priority, application France, Oct. 2, 1964, 990,237, Patent 1,430,148
4 Claims. (Cl. 244—102)

ABSTRACT OF THE DISCLOSURE

A landing gear with tandem wheels coupled to the aircraft along an axis parallel to that of the aircraft, such that the landing gear is retractable and extendable by pivoting around this axis. A bracing in the extended position is provided by two parallel linked struts connected at their linkage points by a rod extending parallel to the axis of the aircraft. A jack controlling the retraction is pivotably connected to the aircraft and acts on an arm of one of the linked struts between the two articulations at the extremities of this arm.

---

Under carriages or landing gears are known which are fixed on each side of the fuselage of the aircraft and in which the wheels, coupled together in tandem, are retractable under the flooring by pivotal movement of each under carriage about a pivotal axis parallel to the axis of the aircraft.

This arrangement has the particular advantage that it requires fairings of only small size.

The present invention has for its object to increase the strength and the safety of under carriages of this type, without however involving any substantial increase in the space required.

The improvement forming the object of the invention consists essentially in bracing the under carriage laterally, with the landing gear down, by two parallel struts which fold-up during lifting, by the action of a common jack and which are housed in the retracted position of the landing gear between the carrier legs of the wheels in tandem.

The device according to the invention can be applied with particular advantage to a landing gear such as described in the applicant's patent of September 3, 1958.

The invention will now be described below by way of example, reference being made to the accompanying drawings, in which:

FIGS. 1, 2 and 3 are views respectively in profile, front and plan of the under carriage in the landing-gear-down position.

Figure 4:
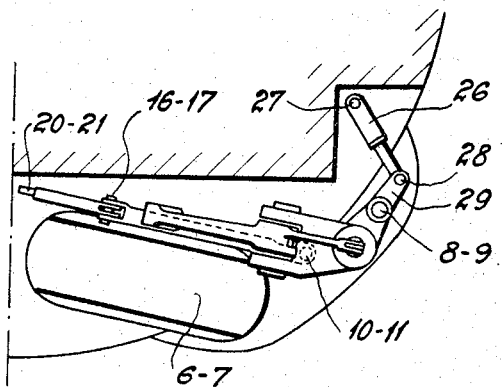
FIGS. 4 and 5 are respectively front and plan views of the under carriage in the landing-gear-retracted position.
Figure 5:
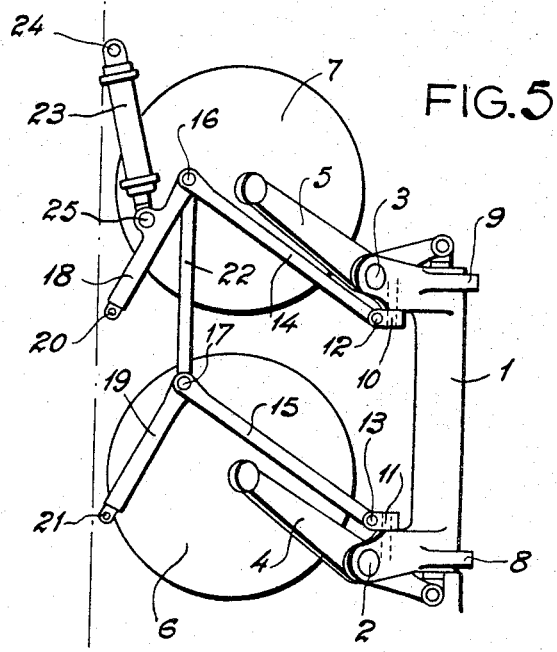

In the drawings, 1 is the body of a single shock absorber comprising two fork members 2 and 3, in which the legs 4 and 5, carrying respectively the wheel 6 and the wheel 7, can oscillate.

Two bearings 8 and 9, formed integrally with the shock absorber 1, provide for the pivotal mounting of the latter on the aircraft about a pivotal axis parallel to the axis of the aircraft.

Two shafts 10 and 11 are pivotally mounted on the body of the shock absorber 1, between the forks 2 and 3. On these shafts 10 and 11 are mounted another pair of forks (not shown) which in turn receive shafts 12 and 13, perpendicular to the first pair, the whole unit forming a universal joint.

On the shafts 12 and 13 are articulated the extremities of two arms 14 and 15, the other extremities of which are respectively pivoted at 16 and 17 on two other arms 18 and 19 which are themselves articulated on the aircraft at 20 and 21.

A crank arm 22 joins together the articulations 16 and 17, and a jack 23 is pivotally mounted on the one hand at 24 on the aircraft and on the other at 25 on the arm 18.

A compensating jack 26 is pivoted at 27 to the aircraft and at 28 to a lever 29 rigidly fixed to the body of the shock absorber 1.

It can be seen that in the landing-gear-down position (see FIG. 3), the jack 23 which comprises an internal mechanical locking system can, by its sole action on the arm 18 and by reason of the coupling function of the crank arm 22, keep in alignment the three articulation points 20, 16 and 12 on the one hand and the three articulation points 21, 17 and 13 on the other.

Thus, by virtue of this arrangement of the bracing and lifting members, the landing gear is braced in the down position by two parallel struts, one of which is constituted by the arms 14 and 18 and the other by the arms 15 and 19, which prevents the assembly from buckling. Lifting is effected by the jack 23 which, as it shortens, brings the arms of the struts out of alignment, these arms remaining parallel in pairs by virtue of the coupling crank 22.

In the landing-gear-retracted position, the strut arms 14 and 15 are housed between the legs 4 and 5, to which they are substantially parallel, thus reducing to a very low value the space occupied under the flooring of the aircraft by this bracing and lifting device.

This device comprising two struts ensuring the bracing of the under carriage with the landing gear down, is made practicable by the fact that its locking is effected by the mechanical action of a single member, namely the jack 23, ensuring the simultaneous alignment of the struts. The solution which consists in associating a mechanical lock with each strut would in fact involve the risk of a premature locking of one of these two bolts, which would have the effect of stopping the operation of the lifting gear and would thus prevent the second bolt from locking. On the contrary, the kinematics of the present invention ensures the alignment of the two struts in a reliable manner, and this is achieved by applying only very small forces on the first strut by the jack 23 and on the second strut through the intermediary of the crank arm 22.

At the beginning of the lifting movement, the compensating jack 26 offers a resistance to the lifting of the under carriage (FIG. 2) and this continues up to the alignment of the articulation points 27, 28 with the shafts 8–9. When the under carriage continues its lifting movement, the jack 26 expands and in consequence adds its action to that of the jack 23 (see FIG. 4). Thus, the compensating jack 26 ensures an optimum lifting efficiency:

On the one hand by providing a resistance force acting in opposition to the lift when the resistance forces due to the weight of the under carriage are small or when these forces act as driving forces, this resistance action of the compensator then assisting in reinforcing the safety of the whole unit;

On the other hand, by adding to the lifting force its own driving force when the forces due to the weight of the under carriage are large and resistant, that is to say at the end of the lifting operation.

Finally, the compensating jack 26 fulfills in addition a safety function in the downward movement of the under carriage. In fact, in the event of failure of the jack 23, the jack 26 provides a driving effort which is particularly useful at the end of the lowering movement in order to provide locking of the landing gear when down, when the force due to the weight of the under carriage becomes negligible or resistant.

It will of course be understood that the compensating jack can be replaced by or associated with any equivalent mechanical means, such as a spring.

What I claim is:

1. An under carriage with wheels in tandem, pivotally mounted on an aircraft about a lifting axis parallel to the longitudinal axis of the aircraft for being selectively retracted and extended, said under carriage comprising a member joining together the wheels in tandem, two articulated parallel struts, each of said struts comprising a first arm articulated to said aircraft and a second arm articulated on the one hand to said first arm by a folding joint, and on the other hand to said member joining together said wheels in tandem, a rod extending parallel to the longitudinal axis of the aircraft and coupling together said folding joints of the struts, said first arm and said second arm of each of said struts being aligned in the extended position of said under carriage so as to insure the bracing of said under carriage, and a jack for retracting and extending the under carriage, said jack having one end pivotally connected to the aircraft and an opposite end connected to the first arm of one of said struts between the connection of said first arm to the aircraft and the folding joint connecting the first arm to the second arm.

2. An under carriage as claimed in claim 1 wherein said member which joins the wheels together in tandem comprises a shock absorber member including a pair of depending legs on which said wheels are respectively supported, said legs in the retracted position of the under carriage extending substantially parallel to the second arms of the struts.

3. An under carriage as claimed in claim 1, and further comprising a lever rigidly fixed to the member joining the wheels in tandem, and a compensating jack articulated on the one hand on said aircraft and on the other hand to said lever, the articulations of said compensating jack being disposed in such manner that they pass through a position of alignment with said lifting axis during the retraction of said under carriage, said compensating jack offering resistance to lifting as long as said position of alignment is not reached, and conversely supplying a driving force at the end of the lowering movement of the landing bear, beyond said position of alignment.

4. An under carriage as claimed in claim 3, in which said compensating jack ensures the locking of said under carriage in the landing-gear-down position.

References Cited

UNITED STATES PATENTS 2,306,269   12/1942   King _____ 244—102

FOREIGN PATENTS 873,882   4/1942   France.
Ad. 51,685   12/1942   France.
1,007,220   10/1965   Great Britain.

MILTON BUCHLER, *Primary Examiner.*

P. E. SAUBERER, *Assistant Examiner.*